United States Patent [19]
Aoyama et al.

[11] Patent Number: 5,703,472
[45] Date of Patent: Dec. 30, 1997

[54] VOLTAGE REGULATOR OF VEHICLE ALTERNATOR

[75] Inventors: Tooru Aoyama, Okazaki; Shigeru Tanaka, Kariya; Kouzi Tanaka, Anjo, all of Japan

[73] Assignee: Nippondenso Co., Ltd., Kariya, Japan

[21] Appl. No.: 635,580

[22] Filed: Apr. 22, 1996

[30] Foreign Application Priority Data

Apr. 28, 1995 [JP] Japan .................................. 7-106430

[51] Int. Cl.$^6$ .................................................. H02J 7/04
[52] U.S. Cl. ............................ 322/28; 322/36; 322/99
[58] Field of Search ........................... 322/17, 21, 25, 322/27, 28

[56] References Cited

U.S. PATENT DOCUMENTS

| | | | |
|---|---|---|---|
| 4,602,205 | 7/1986 | Matsuhashi et al. | 320/64 |
| 4,716,355 | 12/1987 | Morishita et al. | 320/64 |
| 4,985,670 | 1/1991 | Kaneyuki | 322/28 |
| 5,206,553 | 4/1993 | Imai et al. | 307/540 |
| 5,497,117 | 3/1996 | Nakajima et al. | 327/404 |
| 5,572,112 | 11/1996 | Saeki et al. | 323/282 |
| 5,581,172 | 12/1996 | Iwatani et al. | 322/28 |

FOREIGN PATENT DOCUMENTS

| | | |
|---|---|---|
| 1-27401 | 8/1989 | Japan . |
| 5-122999 | 5/1993 | Japan . |
| 5-268733 | 10/1993 | Japan . |
| 6-233598 | 8/1994 | Japan . |
| 6-81431 | 10/1994 | Japan . |

*Primary Examiner*—Steven L. Stephan
*Assistant Examiner*—Nicholas Ponomarenko
*Attorney, Agent, or Firm*—Cushman, Darby & Cushman IP Group of Pillsbury Madison & Sutro LLP

[57] ABSTRACT

Voltage of a terminal at a high impedance is set to a fixed voltage (2.5 V) by a constant current source and a resistor, and whether the voltage of the terminal is a fixed voltage which is between 3.5 V and 5.5 V or not is detected by comparators and a NOR circuit. A control signal is sent from an ECU to the terminal to turn on a switching transistor to lower a divided voltage so that the alternator generates a high voltage only when the voltage of the terminal is the special voltage, and generates normal voltage otherwise. In case of disconnection of the communication line or grounding of the communication line, or when the battery voltage is applied to the communication line, the voltage of the terminal does not become abnormal voltage but become the normal voltage. Thus, abnormal voltage may not applied to the battery.

13 Claims, 7 Drawing Sheets

VOLTAGE REGULATOR OF VEHICLE ALTERNATOR

CROSS REFERENCE TO RELATED APPLICATION

The present application is based on and claims priority from Japanese Patent Applications No. Hei 7-106430, filed on Apr. 28, 1995, the contents of which are incorporated herein by reference.

BACKGROUND OF THE INVENTION

1. Field of the Invention

The present invention relates to a voltage regulator for a vehicle which provides a plurality of regulated output voltages according to outside voltage command signals.

2. Description of the Related Art

An alternator for a vehicle that generates two-leveled battery-charging-voltages according to the vehicle condition is known. When the vehicle is accelerated, the output voltage is intentionally lowered to reduce the load torque, thereby facilitating the vehicle acceleration. When the battery is normally charged, the output power is regulated as if the battery is disconnected to reduce the load torque, thereby reducing the fuel consumption.

Recently, the alternator has been used to regenerate the battery charging current from the kinetic energy which is available during vehicle deceleration or to generate a voltage (30 volt, for instance) which is higher than the battery charging voltage, to energize an electric load, such as a heater of a catalytic converter.

When the output voltage of the generator is changed to a specific voltage as mentioned above, the reference voltage of the regulator is changed by an external voltage command signal to change the field current of the alternator.

When the voltage that is higher than the battery voltage is generated according to the voltage command signal, connection of the electric loads of the alternator must be changed beforehand in order to prevent troubles.

However, when the reference signal is changed according to the external voltage command signal, an abnormal voltage different from the control voltage may be generated if a communication line for the voltage command signal has a trouble, such as disconnection of a connector or grounding of a wire-harness caught between metal member by accident, thereby causing troubles to the alternator, such as a generation stoppage resulting in the battery discharge or an abnormally high voltage resulting in excessive battery charge and battery damage.

SUMMARY OF THE INVENTION

An object of the present invention is to provide an alternator having a voltage regulator which generates normal battery voltages and other specific voltages in which the alternator output voltage is prevented from causing damage to the battery and electric loads for a vehicle even if the communication line of the voltage command signal has the troubles mentioned above.

Another object of the present invention is to provide an alternator having a voltage regulator including an input terminal for receiving an external voltage command signal; means for setting voltage of the input terminal to a fixed voltage; voltage discrimination means for discriminating voltage of the input terminal; and field current controlling means for controlling the alternator to generate a normal output voltage applicable to general electric loads or a specific output voltage applicable to a specific electric load according to voltage of the input terminal.

The voltage discrimination means includes a comparator for comparing the voltage of the input terminal with a first reference voltage and a second reference voltage, which is lower than the first reference voltage/, means for determining voltage of the input terminal, and the field current controlling means includes an alternator voltage dividing circuit and dividing-ratio changing means.

The first reference voltage may be set lower than the voltage of the battery and the second reference voltage may be set lower than the first reference voltage and higher than zero volt.

According to the present invention, when the voltage command signal is received from the outside, the voltage of the input terminal changes according to the voltage command signal; if the voltage command signal is a specific voltage, the output voltage of the alternator becomes a specific output voltage for a specific load; if the voltage of the input terminal becomes other than the specific voltage, the alternator generates a normal output voltage, such as a normal battery voltage or a normal battery charging voltage. That is, if no signal is received, the input terminal becomes a fixed voltage. If the communication line is grounded, the voltage of the input terminal becomes lower than the fixed voltage. If that the battery voltage is applied to the input terminal, the voltage of the input terminal becomes higher than the fixed voltage.

The voltage command signal for generating the two voltages may be allocated to a voltage higher than the first reference voltage and a voltage lower than the second reference voltage.

If the first reference voltage is set lower than the vehicle battery voltage and the second reference voltage is set lower than the first reference voltage and higher than zero voltage and also the battery or the electric load is connected as a electric load, the output voltage of the alternator changes according to the voltage command signal.

If the input terminal is in a high impedance state because the communication line has a disconnection trouble, the output signal of the alternator becomes the normal output signal irrespective of the voltage command signal. Thus, the specific voltage may not be generated in case of the disconnection or affect the battery and the first electric load.

If the communication line is grounded by accident, the voltage of the input terminal becomes lower than the second voltage, the output voltage of the alternator also becomes the normal voltage.

If the communication line is applied with the battery voltage by accident, the voltage of the input terminal becomes the first reference voltage, which is higher than a fixed voltage, and becomes a voltage other than the specific voltage, the output voltage of the alternator becomes the normal output voltage.

As a result, if the voltage command signal is not applied normally to the input terminal due to a trouble of the communication line, the output voltage of the alternator may not become the specific voltage and necessarily becomes the normal voltage so that excessively high voltages are not be applied to the battery or other electric loads and the battery and the electric loads can be protected.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Voltage regulators of alternators according to embodiments of the present invention are described with reference to the appended drawings.

An alternator for a vehicle according to a first embodiment is described with reference to FIG. 1 and FIG. 2.

Figure 1:
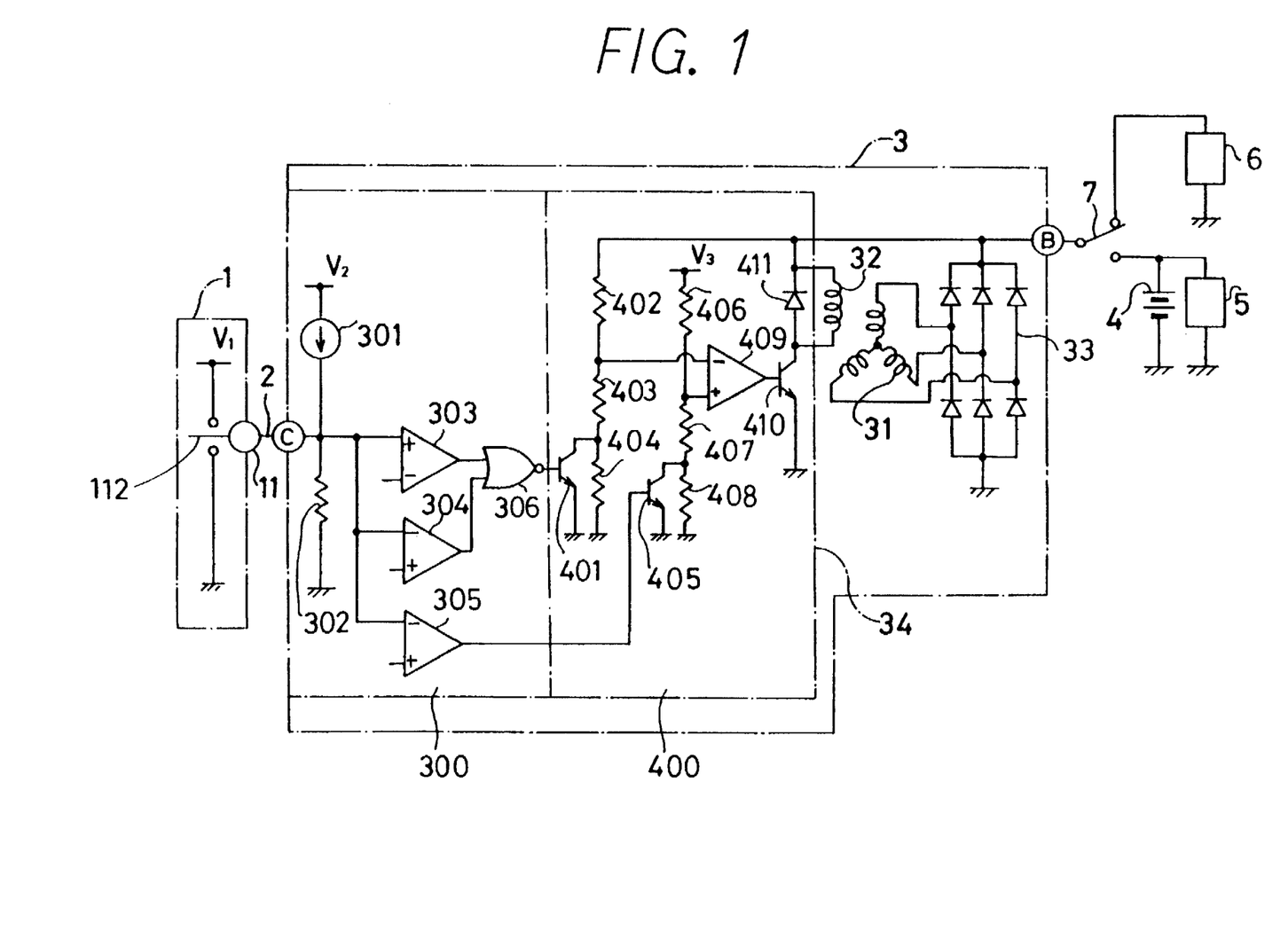
FIG. 1 is a circuit diagram of a vehicle alternator having a voltage regulator according to a first embodiment of the present invention.

In FIG. 1, an outside control device or ECU 1 is connected through a communication line 2 to a three-phase alternator 3. The alternator 3 is composed of a three-phase winding 31, a field coil 32 having a flywheel diode 411, a three-phase full-wave rectifier unit 33 and a generator control unit 34.

A battery 4, an electric load 5 which is connected to the battery 4, and a high-voltage load 6, such as a catalytic converter, having an electric heater, which requires a specific voltage higher than the battery voltage, are connected, respectively, to the alternator output terminal B through a load-selecting switch 7.

The ECU 1 is powered by a constant voltage source $V_1$ whose voltage stabilizes the voltage of the battery 4 to control the operation of an engine according to vehicle conditions, battery terminal voltage, and engine rotational speed when the engine is started, and also sends to a terminal C of the alternator a voltage command signal to regulate the output voltage of the alternator 3.

The voltage command signal changes when a control terminal 11 of the ECU 1 is connected to the ground level, to an open circuit, to an insulated portion (high impedance), or to a specific voltage level $V_1$ (5 V) by a switching element 112.

When the control terminal 11 is grounded, the alternator 3 generates an output voltage which is a lower standard voltage (12.8 V) and corresponds to a normal terminal voltage of the battery 4 (voltage without charge or discharge current).

When the control terminal 11 is open or connected to an insulating portion (high impedance), the alternator 3 generates an output voltage higher than a standard voltage (14.5), which corresponds to a charging voltage of the battery 4 connected with normal loads.

When the constant voltage V1 is applied to the control terminal 11, the alternator 3 generates a specific voltage (30 V) for the high voltage load 6.

The ECU 1 controls the operation of the load-selecting switch 7 in synchronism with the voltage command signal appearing on the control terminal 11. The ECU 1 usually connects the load-selecting switch 7 to the electric load 5. When the engine is started, the ECU 1 connects the load selecting switch 7 to the high voltage load 6.

A generator control unit 34 is composed of a signal discrimination circuit 300 and a voltage regulation circuit 400.

The discrimination circuit 300 has the terminal C to connect the communication line 2 and receive the voltage command signal from the control terminal 11 of the ECU 1. The terminal C is connected to a bias circuit, which is composed of a constant current source 301 and a resistor 302 connected between the terminal C and a grounding portion 302. The signal discrimination circuit 300 has three comparators 303, 304 and 305 to discriminate voltage levels applied to the terminal C.

The comparators 303 and 304 together with a NOR circuit 306 compose a window-comparator. A positive input terminal of the comparator 303 is connected to the terminal C so that the comparator 303 generates a Hi-level signal when the voltage of the terminal C is higher than 5.5 V and a Lo-level signal when the voltage level of the terminal C is lower than 5.5 V. A negative input terminal of the comparator 304 is connected to the terminal C so that the comparator 304 generates a Hi-level signal when the voltage of the terminal C is lower than 3.5 V and a Lo-level signal when the voltage of the terminal C is higher than 3.5 V.

With the comparators 303 and 304 being connected, the output signal of the NOR circuit 306 becomes a Hi-level only when the voltage of the terminal C falls into a range between 3.5 V and 5.5 V, and becomes a Lo-level when the voltage of the terminal C is either lower than 3.5 V or higher than 5.5 V.

On the other hand, the comparator 305 generates a Hi-level signal when the voltage of the terminal C becomes lower than 1.5 V and generates a Lo-level signal when the voltage of the terminal C is higher than 1.5 V.

Figure 3:
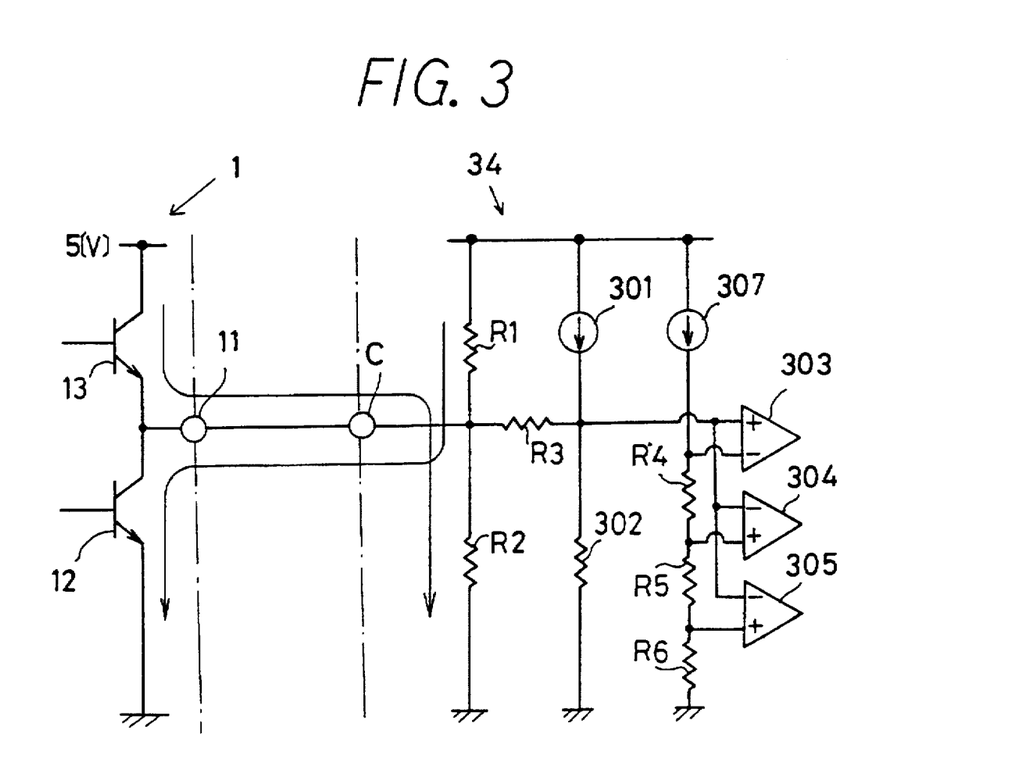
FIG. 3 is a portion of a circuit diagram showing a variation of an interface with a communication line of the first embodiment.

The terminals of the comparators 303-305, other than those described above, are connected to a reference voltage circuit (as shown in FIG. 3).

The voltage regulation circuit 400 is composed of three resistors 402, 403 and 404, a voltage dividing circuit which divides the output voltage of the alternator by a switching transistor 401 connected to the output terminal of the NOR circuit 306, a reference voltage circuit having a switching transistor 405 connected to the output terminal of the comparator 305 and a series circuit of the three resistors 406, 407 and 408, a comparator 409 which compares the output voltage of the voltage dividing circuit and the reference voltage circuit introduced respectively into negative and positive input terminals thereof and a transistor 410 which supplies electric current to the field coil 32 according to the output signal of the comparator 409. The field current of the alternator 3 is controlled according to the respective output signals of the comparator 305 and the NOR circuit 306.

When the voltage of the terminal C is lower than 1.5 V, the output signal of the NOR circuit 306 becomes a Lo-level signal and the output signal of the comparator 305 is a Hi-level signal so that the transistor 401 is turned off, transistor 405 is turned on to short-circuit the resistor 408. Then, the reference voltage of the positive input terminal of the comparator 409 decreases, and such field current as the alternator 3 generates a lower standard voltage (12.8 V), which is the normal battery voltage, is supplied to the field coil 32.

When the voltage of the terminal C is between 1.5 V and 3.5 V, the output signal of the NOR circuit 306 becomes a Lo-level signal and the output signal of the comparator 305 is a Lo-level signal so that both transistors 401 and 405 are turned off and the voltage divided by the resistors 402-404 and the reference voltage set by the resistors 406-408 provide the field coil 32 with such field current so as cause the alternator 3 to generate a higher standard voltage (14.5 V), which is the voltage when the battery is charged and the electric load 5 is connected to the battery 4.

When the voltage of the terminal C is between 3.5 V and 5.5 V, the output signal of the NOR circuit 306 becomes a Hi-level signal and the output signal of the comparator 305 becomes a Lo-level signal, the transistor 401 is turned on and the transistor 405 is turned off; the resistor 404 is short-circuited to lower the divided voltage of the output voltage of the alternator 3; the voltage of the negative input terminal of the comparator 409 decreases, thereby providing the field coil 32 with such field current so as cause the alternator to generate an output voltage (30 V) supplied to the high voltage load.

Figure 2:
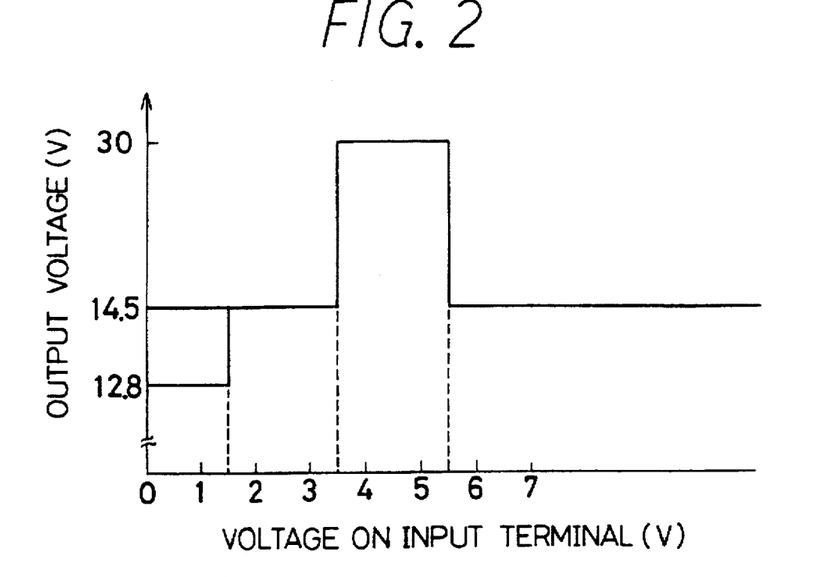
FIG. 2 is a graph showing a relationship between a terminal voltage and an output voltage in the first embodiment.

A relationship between the output voltage of the alternator 3 regulated by the generator control unit 34 and the voltage appearing on the terminal C is shown in FIG. 2.

In the voltage regulator of the alternator for a vehicle according to the above embodiment described above, when the communication line 2 between the control terminal 11 of the ECU 1 and the terminal C of the alternator 3 is normal, the field current is controlled by the voltage regulation circuit 400 according to the voltage command signal sent from the control terminal 11 so that the output signal of the alternator 3 provides the lower standard voltage (12.8 V), the higher standard voltage (14.5 V) or the high voltage (30 V).

The voltage of the terminal C is set to about 2.5 V to turn off both transistors 401 and 405 when a trouble of the communication line 2, such as disconnection of harnesses or the like takes place. In such case, the field current is controlled to regulate the output voltage of the alternator 3 to the standard voltage (14.5 V). As a result, excessively high voltage is not be applied to the battery 4, the electric load 5 or the like, thereby protecting the battery 4 and the electric load 5 for a vehicle.

When the communication line 2 is in contact with a supply line of the battery 4 due to a trouble and the battery voltage (12.8 V) is applied to the terminal C, both transistors 401 and 405 are turned off to control the field current so that the alternator 3 generates the higher standard voltage (14.5 V). As a result, an abnormally high voltage is not applied to the battery 4, the electric load 5 and the like, thereby protecting the battery 4 and the electric load.

On the other hand, when the communication line 2 is in a trouble such as contacting with a portion of a vehicle body or the like and the voltage of the terminal C becomes the ground level regardless of the voltage command signal of the ECU 1, the transistor 401 is turned off and the transistor 405 is turned on to control the field current so that the alternator generates the lower standard voltage (12.8 V). As a result, abnormally high voltage is applied to the battery 4, the electric load 5 and the like, thereby protecting the battery 4 and the electric load 5.

Examples and variations of the interfaces for the voltage command signal of the control terminal 11 of the ECU 1 and the terminal C of the generator control unit 34 are shown in FIG. 3. The same reference numerals indicate the same or substantially the same parts or portions as the first embodiment.

The ECU 1 has transistors 12 and 13 in the embodiment illustrated in FIG. 3. If the command signal becomes the ground level, if the transistor 12 is turned on and the transistor 13 is turned off. The command signal becomes the open level (high impedance) if both transistor 12 and 13 are turned off. The specific voltage (5 V) is provided on the control terminal 11 if the transistor 13 is turned on and the transistor 12 is turned off.

On the other hand, an impedance converting circuit composed of resistors R1, R2 and R3 is connected between the bias circuit composed of the constant current source 301 and the terminal C. A constant current source 307 and resistors R4, R5, R6 form a reference voltage circuit for setting a reference voltage of the comparators 303-305.

Figure 4:
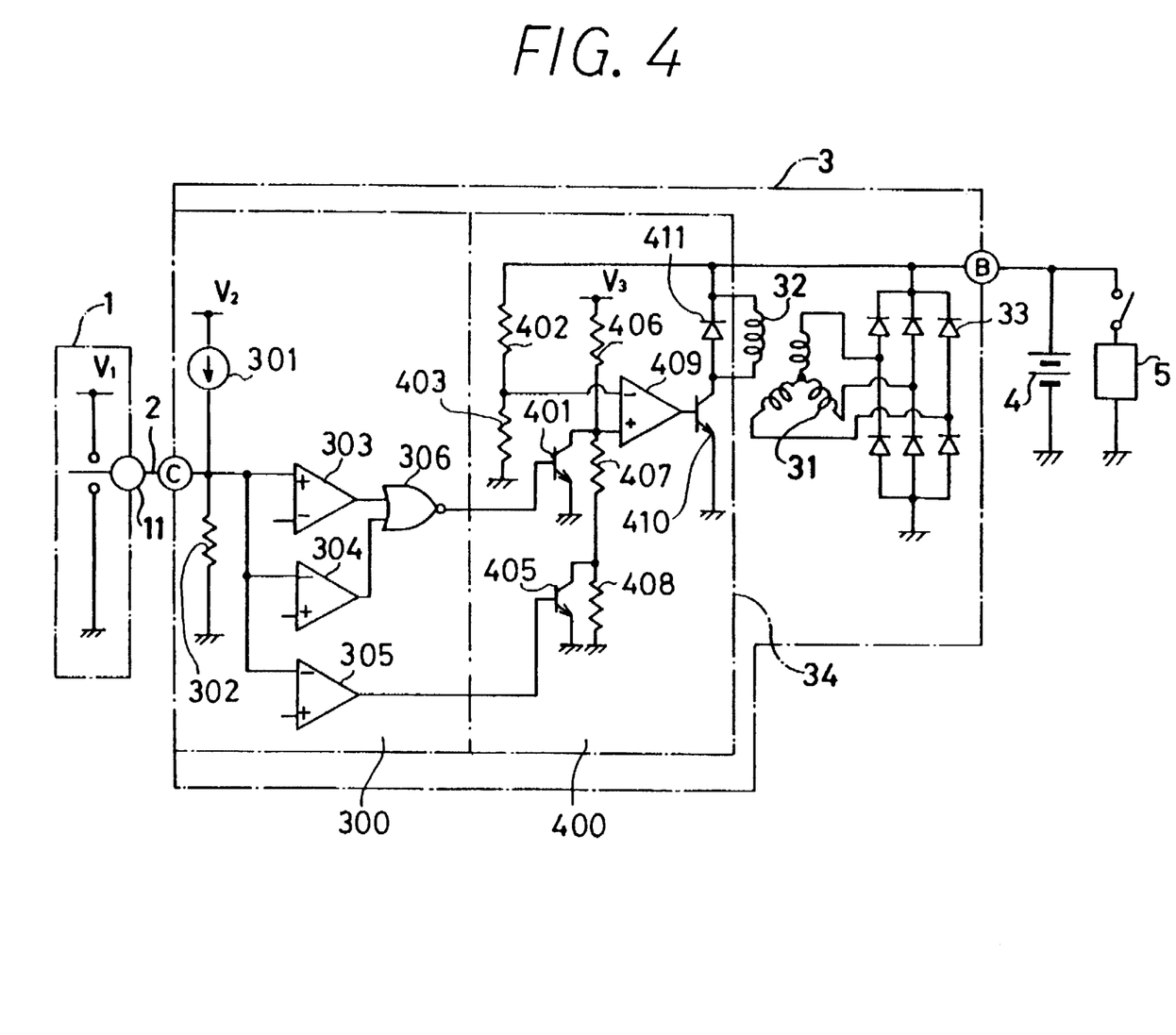
FIG. 4 is a circuit diagram of a vehicle alternator having a voltage regulator according to a second embodiment of the present invention.

A second embodiment of the present invention is described with reference to FIGS. 4 and 5. The same reference numerals indicate the same or substantially the same parts or portions as the first embodiment.

The voltage dividing circuit for the negative input terminal of the comparator 409 is composed of two resistors 402 and 403 to provide a constant voltage. Transistor 401 is connected to the positive input terminal of the comparator 409 and controlled by the output signal of the NOR circuit 306 of the signal discrimination circuit 300 to ground the positive input terminal of the comparator 409.

As a result, when the voltage of the terminal C is between 3.5 V and 5.5 V, the transistor 401 is turned on to ground and lowers the positive input terminal of the comparator 409 so that the output signal of the comparator 409 becomes a Lo-level level and the transistor 410 is turned off. Thus, the field current is not supplied to the field coil 32, thereby stopping generation of the alternator 3.

Figure 5:
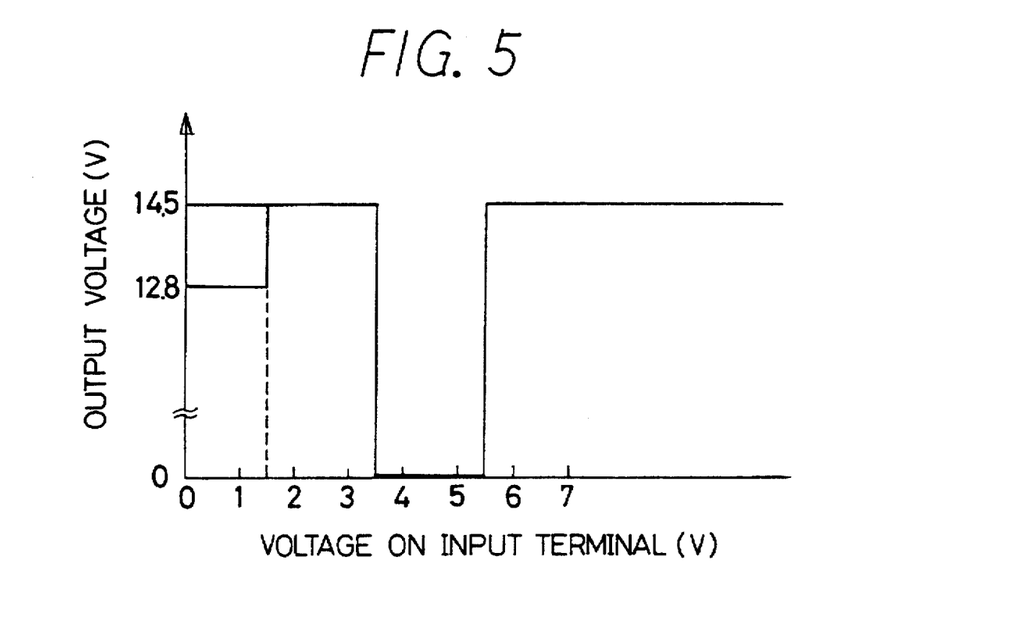
FIG. 5 is a graph showing a relationship between a terminal voltage and an output voltage in the second embodiment.

A relationship between the voltage of the terminal C and the output voltage of the alternator 3 according to the second embodiment is the same as that of the first embodiment except that the voltage of the terminal C is between 3.5 V and 5.5 V as shown in FIG. 5. It is noted that the high voltage electric load or load selecting switch is not disposed in the second embodiment.

Figure 6:
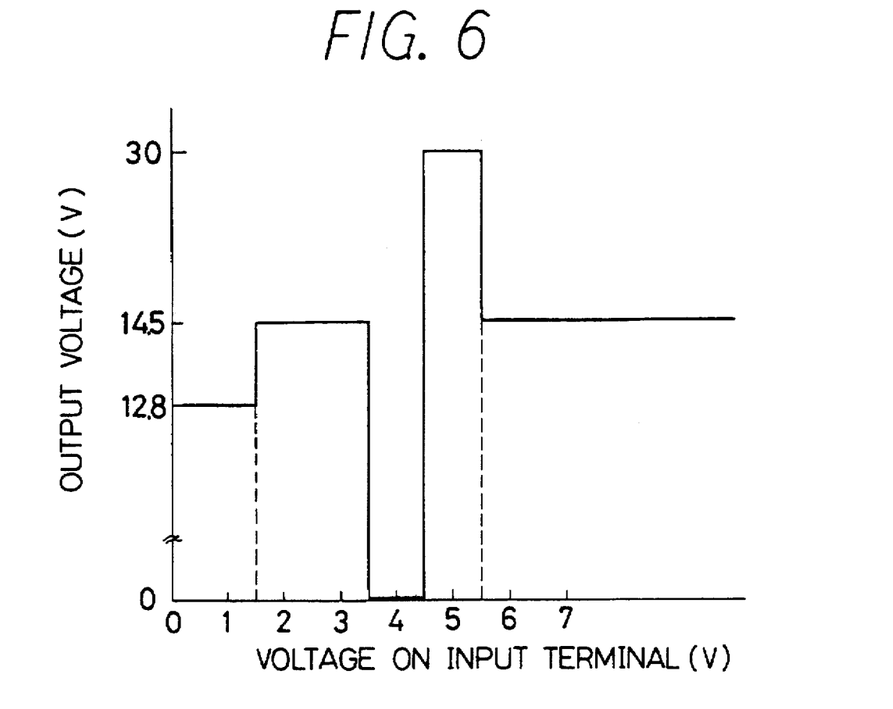
FIG. 6 is a graph showing a relationship between a terminal voltage and an output voltage in the variation of the second embodiment.

FIG. 6 shows a relationship between the voltage of the terminal C and the output voltage of the alternator if the high voltage control and the generation stop are provided with the respective embodiments combined.

The specific voltage is divided into two ranges, 3.5 V–4.5 V and 4.5 V–5.5 V, so that two generating states, generation stop and high voltage generation, are provided in this embodiment.

Figure 7:
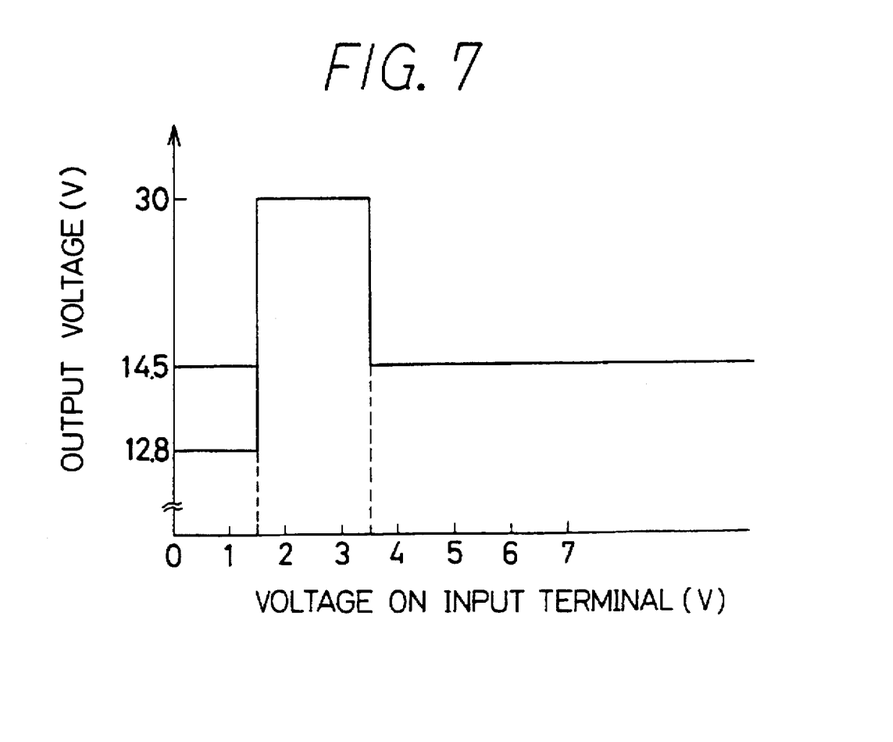
FIG. 7 is a graph showing a relationship between a terminal voltage and an output voltage in a third embodiment.
Figure 8:
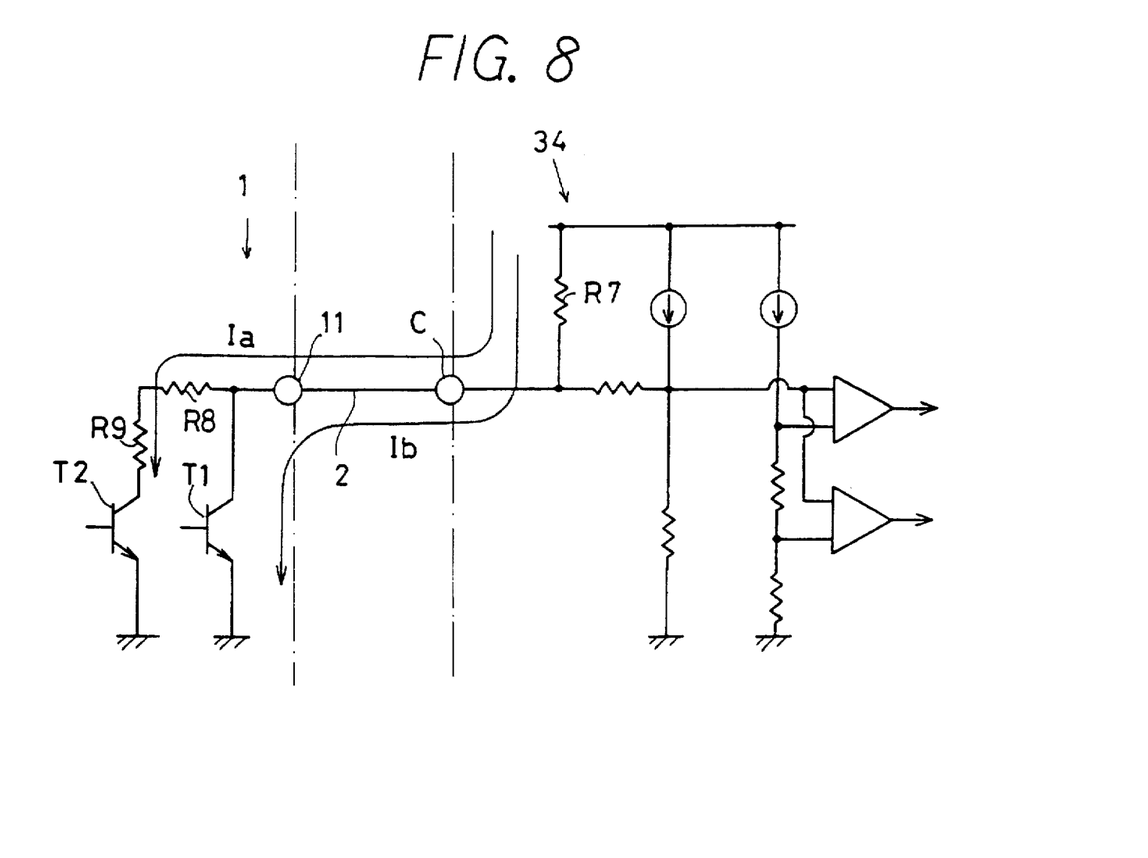
FIG. 8 is a portion of a circuit diagram showing a variation of an interface with a communication line of the third embodiment.

A third embodiment is illustrated in FIG. 7 and FIG. 8.

The specific voltage of the preceding embodiments is set higher than the voltage in the high impedance. However, the specific voltage of the third embodiment is set lower than the voltage in the high impedance. A relationship between the voltage of the terminal C and the output voltage of the alternator 3 in this embodiment is shown in FIG. 7.

The generator control unit 34 controls the voltage of the terminal C to be 6–7 V in the high impedance and 2.5 V in case of the specific voltage for the high voltage or the generation stop.

FIG. 8 illustrates an interface of the third embodiment.

When the terminal C in FIG. 8 is at a high impedance, both transistors T1 and T2 are turned off. In order to apply the specific voltage to the terminal C, a transistor T2 is turned on and a transistor T1 is turned off. As a result, a current Ia flows through series-connected resistors R7, R8 and R 9 to lower the voltage of the terminal C from the high impedance voltage 6–7 V to 2.5 V.

In order to ground the terminal C, the transistor T1 is turned on so that the current Ib flows to make the voltage of the terminal C 0 V.

The resistor R9 can be replaced with an internal impedance of the electric current source.

Figure 9:
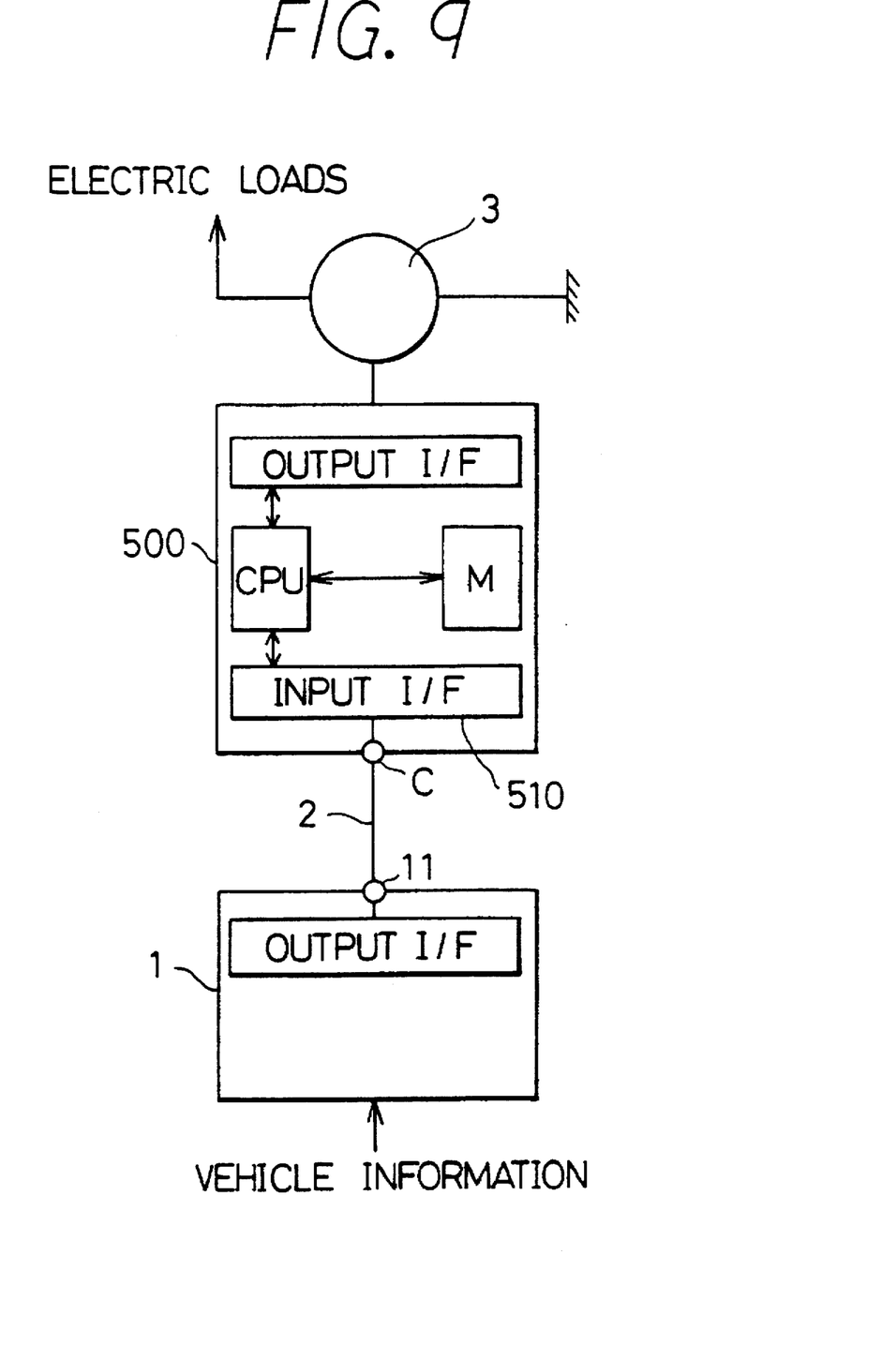
FIG. 9 is a block diagram illustrating a vehicle alternator having a voltage regulator according to a fourth embodiment of the present invention.
Figure 10:
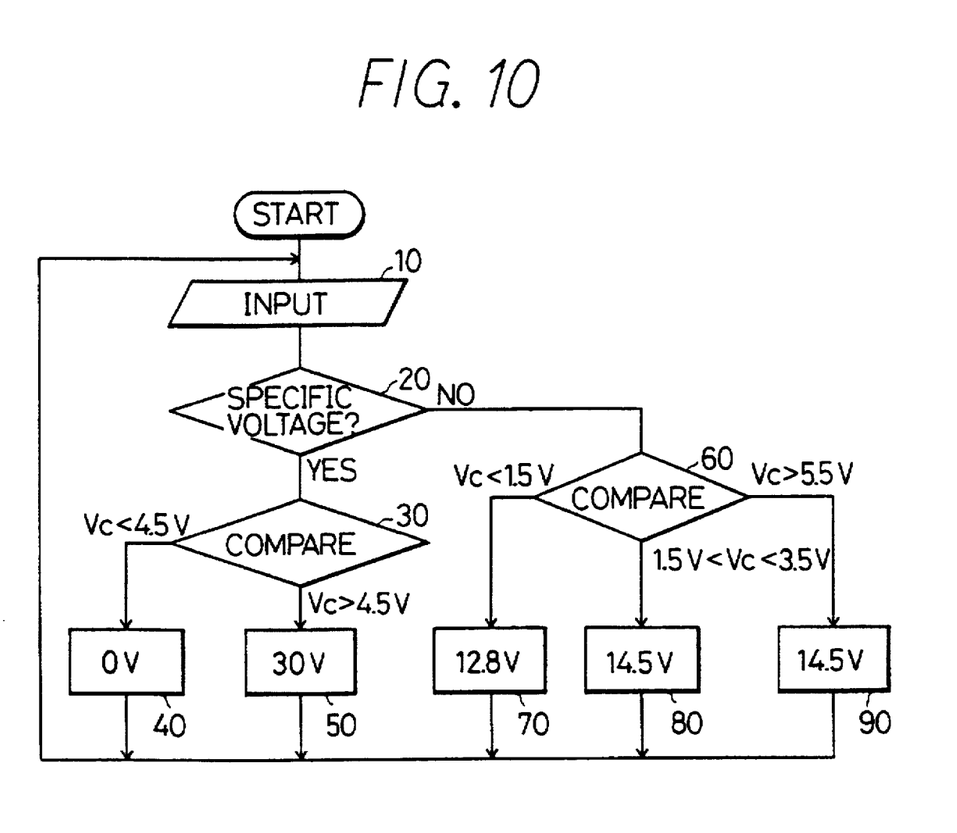
FIG. 10 is a flow chart of operation according to the fourth embodiment of the present invention.

A fourth embodiment is described with reference to FIG. 9 and FIG. 10.

A microcomputer 500 is used to regulate the output voltage of the alternator 3 instead of the comparators used to detect the voltage of the terminal C in the previous embodiments.

The operation is described below with reference to FIG. 10.

Voltage information is taken in by an A/D converter of an interface 510 in a step 10 and whether voltage Vc of the terminal C is the specific voltage between 3.5 and 5.5 or not is determined according to the voltage information taken into the terminal C in a step 20. If terminal C provides the specific voltage (YES), whether the voltage Vc of the terminal C is lower than 4.5 V or not, or higher than 4.5 V or not is determined in a step 30. If lower than 4.5 V (Vc<4.5 V), the output voltage of the alternator 3 is regulated to 0 V in a step 40. If the voltage Vc is higher than 4.5 V (Vc>4.5 V), the output voltage of the alternator is regulated to 30 V in a step 50.

If the voltage Vc is not the specific voltage (NO), level of the voltage Vc is detected in a step 60, and if the voltage Vc is lower than 1.5 V or is the ground level (Vc<1.5 V), the output voltage is regulated to 12.8 V in a step 70. In case of Vc being 2.5 V (1.5 V<Vc<3.5 V), the output voltage is regulated to 14.5 V in a step 80. If the battery voltage is applied to the terminal C (Vc>5.5 V), the output voltage of the alternator is regulated to 14.5 V in a step 90.

As a result, the relationship between the voltage V of the terminal C and the output voltage of the alternator 3 becomes as shown in FIG. 6.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A voltage regulator for controlling a field current of a vehicle alternator which generates a battery charging voltage and a specific output voltage different from said battery charging voltage according to signal levels of an external control signal, said voltage regulator comprising:

an input terminal for receiving said external control signal;

means, connected to said input terminal, for setting a terminal voltage corresponding to said battery charging voltage if said external control signal is not received;

means, connected to said input terminal, for discriminating a specific signal level from said signal levels of said external control signal; and field current controlling means, connected to said voltage discriminating means, for controlling said field current of said alternator to generate said specific output voltage responsive to said discriminating means discriminating that said signal level of said external control signal at said input terminal has said specific signal level and to generate said battery charging voltage responsive to said discriminating means not discriminating that said signal level of said external control signal at said input terminal has said specific signal level.

2. A voltage regulator as claimed in claim 1, wherein said voltage discriminating means comprises a pair of comparators for comparing a signal level of said external control signal with two reference levels, thereby discriminating said specific signal level responsive to said signal level being between said two reference levels; and said field current controlling means provides a first reference voltage responsive to said discriminating means discriminating that said external control signal at said input terminal has said specific signal level and provides a second reference voltage responsive to said discriminating means not discriminating that said external control signal at said input terminal is at said specific signal level.

3. A voltage regulator as claimed in claim 2, wherein said first reference voltage is set lower than a voltage of said battery and said second reference voltage is set higher than zero volts.

4. A voltage regulator as claimed in claim 1, wherein said specific output voltage is higher than a battery charging voltage.

5. A voltage regulator as claimed in claim 1, wherein said specific output voltage is a voltage corresponding an output of said alternator after stopping generation.

6. A voltage regulator as claimed in claim 1, wherein said battery charging voltage is set to two different voltage ranges.

7. A voltage regulator of for controlling a field current of a vehicle alternator which generates a plurality of output voltages for a plurality of electric loads including a battery according to a plurality of signal levels of an external control signal, said voltage regulator comprising:

an input terminal for receiving said external control signal;

means, connected to said input terminal, for setting a voltage of said input terminal to a fixed control voltage if no external control signal is received;

means, connected to said input terminal, for discriminating a fixed control voltage from voltages of said external control signal at said input terminal; and field current controlling means, connected to said voltage discriminating means, for controlling said field current of said alternator to generate a fixed output voltage responsive to said voltage of said input terminal being equal to said fixed control voltage, and controlling said field current so that said output voltage of said alternator becomes an output voltage other than said fixed output voltage responsive to said voltage of said input terminal being other than said fixed control voltage, wherein said field current controlling means controls said field current of said alternator to generate a first output voltage corresponding to a first electric load responsive to said voltage of said input terminal being other than said fixed control voltage, and controls said field current to generate an output voltage other than said first output voltage responsive to said voltage of said input terminal being equal to said fixed control voltage.

8. A voltage regulator as claimed in claim 7, wherein said voltage discriminating means comprises:

a comparator, for comparing said voltage at said input terminal to a first reference voltage and to a second reference voltage which is lower than said first reference voltage; and means for determining that said voltage at said input terminal is said fixed control voltage responsive to said voltage of said input terminal being between said first and second reference voltages; and, wherein said field current controlling means comprises:

a first circuit for dividing an output voltage of said alternator by a dividing ratio; and a second circuit for changing said dividing ratio of said first circuit according to determinations made by said determination means.

9. A voltage regulator as claimed in claim 8, wherein said first reference voltage is lower than a voltage of said battery and said second reference voltage is set higher than zero volts.

10. A voltage regulator of a vehicle alternator as claimed in claim 7, wherein said field current controlling means controls said field current of said alternator to generate a battery charging voltage responsive to said voltage at said input terminal being other than said fixed control voltage, and controls said field current to generate a driving voltage of a catalytic converter heater responsive to said voltage at said input terminal being equal to said fixed control voltage.

11. A voltage regulator as claimed in claims 7, wherein said field current controlling means controls said field current of said alternator to stop generation responsive to said voltage at said input terminal being equal to said fixed control voltage.

12. A voltage regulator as claimed in claim 11, wherein said first electric load is a vehicle battery and said first output voltage is a battery charging voltage.

13. A voltage regulator as claimed in claim 12, wherein said first output voltage is divided into two voltages according to said voltage at said input terminal.

* * * * *